United States Patent [19]

Tomioka et al.

[11] Patent Number: 5,791,920
[45] Date of Patent: Aug. 11, 1998

[54] PC CARD ELECTRICAL CONNECTOR

[75] Inventors: Shoichi Tomioka; Shu Obara, both of Tokyo, Japan

[73] Assignee: Hirose Electric Co., Ltd., Tokyo, Japan

[21] Appl. No.: 714,687

[22] Filed: Sep. 16, 1996

[30] Foreign Application Priority Data

Oct. 17, 1995 [JP] Japan .................. 7-293361

[51] Int. Cl.[6] .................................................. H01R 13/62
[52] U.S. Cl. ............................................................ 439/159
[58] Field of Search ................................. 439/159, 160, 439/153, 155, 152

[56] References Cited

U.S. PATENT DOCUMENTS 5,466,166  11/1995  Law et al. ........................ 439/159
5,492,480   2/1996  Fusselman et al. .............. 439/157
5,564,936  10/1996  David et al. ..................... 439/159

*Primary Examiner*—Neil Abrams
*Assistant Examiner*—T. C. Patel
*Attorney, Agent, or Firm*—Kanesaka & Takeuchi

[57] ABSTRACT

An ejector lever (9) has a first push portion (10) and a second push portion (12) spaced from the fulcrum stud (8) further than the first push portion (10) in order to push a slider member (13). The second push portion (12) is provided on a cantilever spring (11) so as to provide the slider member (13) with spring forces when the first push portion (10) releases the connection between the PC card (1) and the connector section (5).

4 Claims, 3 Drawing Sheets

5,791,920

PC CARD ELECTRICAL CONNECTOR

BACKGROUND OF THE INVENTION

1. Field of the Invention

The present invention relates to PC card electrical connectors.

2. Description of the Prior Art

Japanese patent application Kokai No. 243299/94 discloses an electrical connector having a connector section to be connected to a PC card having a plurality of contact elements at a front end thereof. This connector has a pair of guide sections for guiding sides of a PC card and the connector section connected to the rear portions of the guide sections. An ejector lever is provided on the connector section for rotation and having abutment portions for abutment with the front end of the PC card for pushing the PC card forwardly. An ejector bar is connected to the ejector lever and is movable rearwardly when pushed by the operator. A pushing portion is provided on the front portion of the ejector lever for pushing the front end of the PC card. When the ejector lever is depressed, the rotation center moved from the first fulcrum to the second fulcrum. That is, the ejector lever has two cam portions. When the ejector lever is depressed, the first cam abuts against the abutment of the housing forming the first fulcrum for rotation which provides a relatively large force for disconnecting the PC card from the connector section. When the ejector lever is further depressed, the second cam and the second abutment form the second fulcrum for rotation which provides a long stroke for moving the disconnected PC card for easy removal.

However, the pushing portion is provided on the front end of the ejector lever so that the PC card is pushed at a front corner, making the PC card inclined in the space within the housing and causing damage to the side of PC card. In addition, the fulcrum point of the ejector lever moves from the first point to the second point providing uneasy sense of operation.

SUMMARY OF THE INVENTION

Accordingly, it is an object of the invention to provide a PC card electrical connector capable of pushing the PC card uniformly over the entire width, providing the slider member with the pushing force working in two steps so as to disconnect the PC card from the connector section smoothly, and moving the PC card to a large extent in the removing direction after the disconnection.

According to the invention, the housing has a pair of guide sections for guiding sides of a PC card and a connector section connected to the rear portions of the guide sections. A slider member is provided on the connector section for sliding movement along the guide sections and has abutment portions for abutment with the front end of the PC card. An ejector lever is rotatable about a fulcrum point provided on the housing for pushing the slider member forwardly. An ejector bar is connected to the ejector lever and is movable rearwardly under pressure applied by the operator.

A first push portion is provided near the fulcrum point, and a second push portion is spaced from the fulcrum point further than the first push portion for applying a spring force to the slider member when the PC card is disconnected from the connector section. When the ejector lever is depressed, the first push portion pushes the slider member with a large force for uniformly pushing the PC card to disconnect the PC card from the connector section and then resiliently pushing the slider member for a large length in the removing direction.

According to an embodiment of the invention, the second push portion is made in the form of a cantilever spring extending from the ejector lever so that it flexes to produce a spring force by a displacement of the slider member until the PC card is disconnected from the connector section and then pushes the slider member with the spring force when the PC card is disconnected from the connector section.

According to another embodiment of the invention, there are provided springs deformed by a movement of the slider member when the PC card is connected to the connector section and a lock mechanism for locking the spring in the elastic deformation state and releasing the lock when the PC card is disconnected from the connector section. The PC card is moved to a large extent in the removing direction when the PC card is disconnected from the connector section in this embodiment, too.

The spring provided between the slider member and the housing has a return spring force smaller than the connection force between the PC card and the connector section. In this case, the spring force is always applied to the PC card via the slider member but starts to work after the PC card is disconnected from the connector section because the force is smaller than the connection force between the PC card and the connector section.

DESCRIPTION OF THE PREFERRED EMBODIMENT

Embodiments of the invention will now be described with reference to the accompanying drawings.

Figure 1:
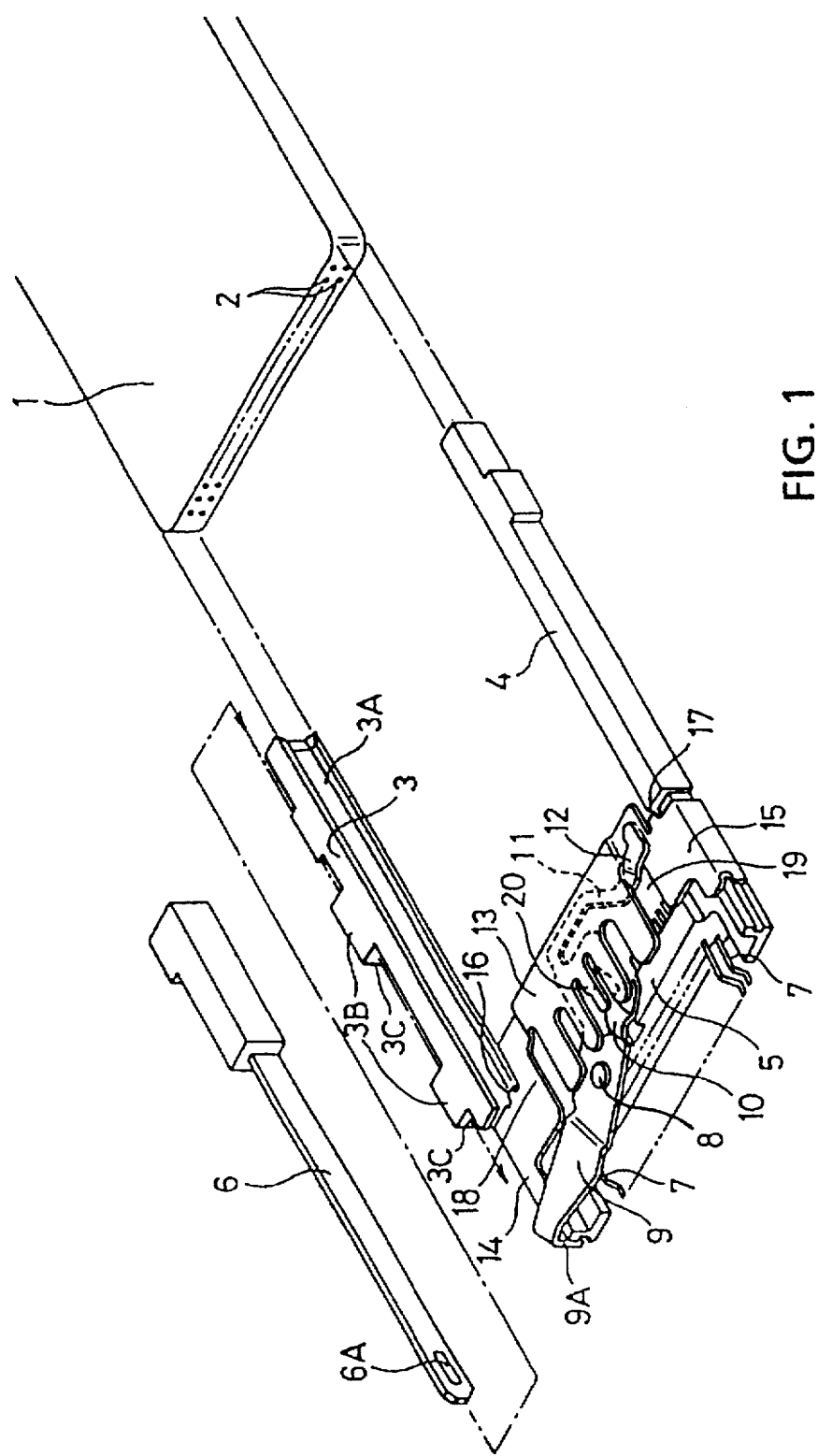
FIG. 1 is a perspective view of a PC card connector according to an embodiment of the invention.

In FIG. 1, a PC card 1 has a plurality of contact elements 2 disposed at a front end thereof. A pair of guide sections 3 and 4 are connected at rear ends thereof to a connector section 5 to form a housing. A pair of guiding channels 3A and 4A are provided in the opposed inner sides of the guide sections 4 and 5 for guiding the PC card. Protruded sections 3B are provided on the outer side of a guiding bar 3 and have slots 3C for supporting an ejector bar 6 for forward/backward sliding movement.

A plurality of contact elements 7 extend through the connector section 5 in forward/backward directions such that the front portions correspond to the contact elements 2 while the rear portions are disposed in a zigzag fashion and bent downwardly for connection to a printed circuit board.

A fulcrum stud 8 is provided on the top of the connector section 5 for rotatably supporting an ejector lever 9. The ejector lever 9 has a C-shaped end 9A for engagement with an engaging hole 6A of the ejector bar 6. The ejector lever 9 is made by stamping and forming a metal sheet so as to provide a first pressure portion 10 between the stud 8 and the other end thereof. A cantilever spring 11 extends laterally from the front edge of the ejector lever 9 and has a second push portion 12 at a front end thereof.

A slider member 13 is provided on the top of the connector section 5 for forward/backward sliding movement in a predetermined range. The slider member 13 is made by stamping and forming a metal sheet so as to provide C-shaped end portions 14 and 15 for sliding movement along the guiding sections 3 and 4. A pair of abutment tabs 16 and 17 extends downwardly from the front edge of the slider member 13 for abutment against the PC card 1 for removal.

A left side recess 18 and a right side recess 19 extend forwardly from the rear edge of the slider member 13, and an intermediate section between them is raised by at least the thickness of the ejector lever 9. Conversely, the portions of the ejector lever to the left from the left recess 18 and to the right from the right recess 19 are raised by the thickness of the slider member 13. Thus, when the slider member 13 and the ejector lever 9 are in motion, they can intersect each other at the left and right side recesses 18 and 19.

An abutment portion 20 extends downwardly and then forwardly from the central rear edge of the slider member 13 for abutment against the pushing portion 10 of the ejector lever 9.

Figure 2:
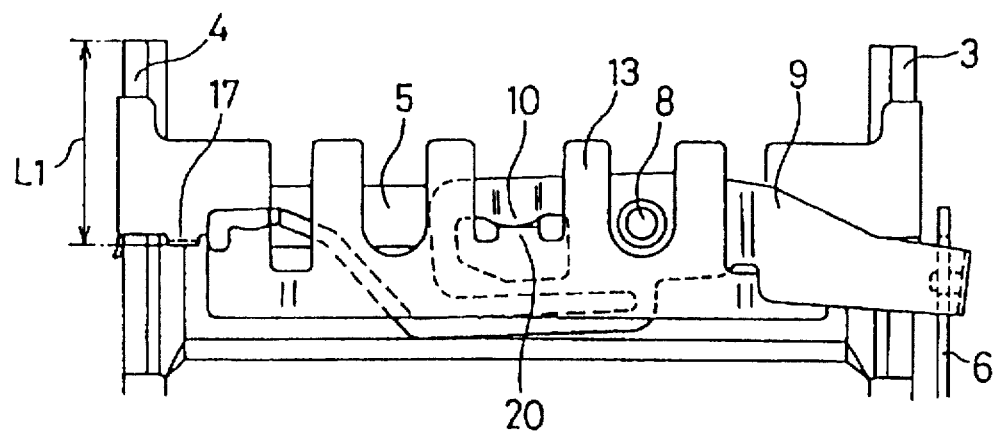
FIGS. 2(A)–(C) are plan views of the connector section showing the connection/disconnection of a PC card.
Figure 2:
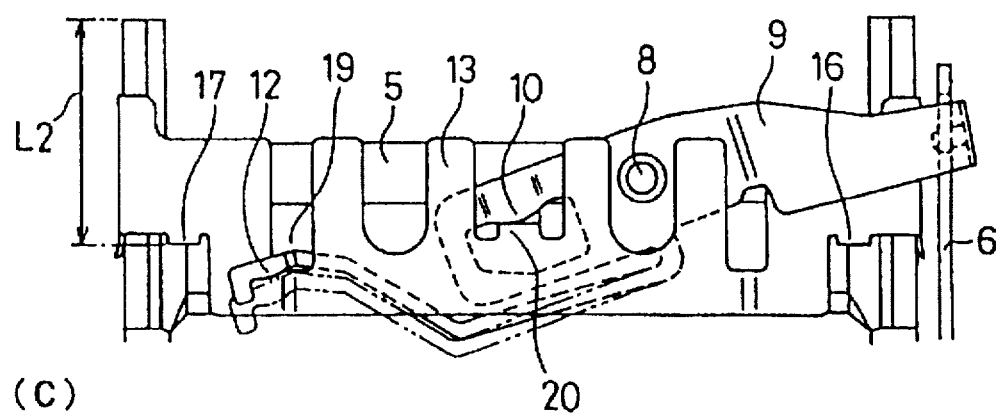
Figure 2:
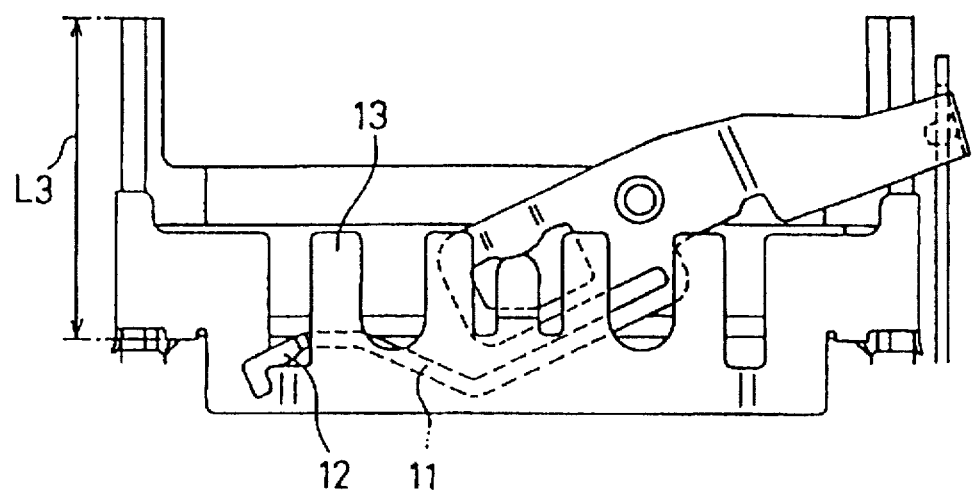

The operation of the electrical connector will be described below with reference to FIGS. 2(A)–(C).

(1) When a PC card 1 is inserted, the front end of the PC card 1 abuts against the abutment portions 16 and 17 of the slider member 13 to move the slider member 13 rearwardly to the most retreated position as shown in FIG. 2A and fits over the contact elements of the connector section 5. The most retreated position of the slider member 13 is indicated by a distance L1 between the abutment stabs 17 and the rear end of the guide section 4. When the slider member 13 is moved to the most retreated position, the convex pushing portion 20 of the slider member 13 abuts against the abutment portion 10 of the ejector lever 9 to rotate the ejector lever 9 clockwise about the fulcrum stud 8 thereby moving forwardly the ejector bar 6.

(2) To remove the PC card 1, the ejector bar 6 is depressed rearwardly as shown in FIG. 2(B). The rearward movement of the ejector bar 6 turns the ejector lever 9 counterclockwise about the fulcrum stud 8 so that the pushing portion 10 abuts against the abutment portion 20 and pushes the slider member 13 forwardly. Consequently, the abutment stabs 16 and 17 of the slider member 13 push forwardly the PC card for disconnection from the connector section 5. L2 is the distance between the abutment stab 17 and the rear end of the guide bar 4 (L2>L1). The second push portion 12 of the cantilever spring 11 engages the recess 19 of the slider member 13 to prevent the cantilever spring 11 from turning to the position indicated by a phantom line so that cantilever spring 11 flexed and stores the elastic deformation energy.

(3) When the PC card is released from the connector section 5 in the above step (2), the slider member 13 is pushed forwardly by the return spring force produced by the elastic deformation of the cantilever spring 11 as shown in FIG. 2(C). This position is indicated by L3 (L3>L2). Since the second push portion 12 is spaced far from the stud 8, the length of forward movement of the slider member 13 is large.

Figure 3:
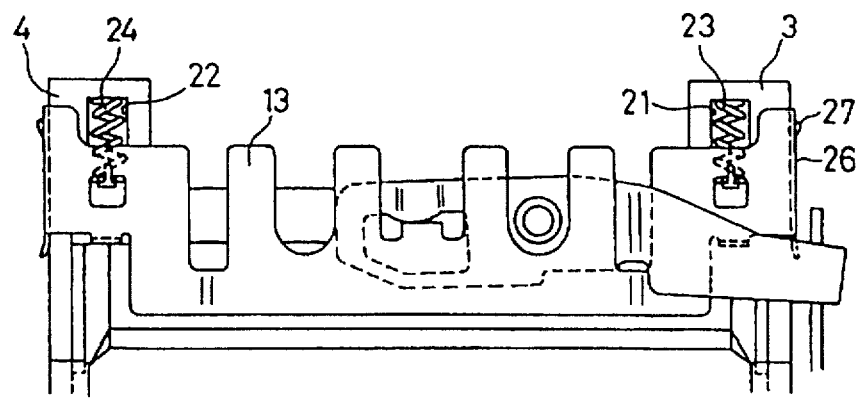
FIG. 3 is a plan view of the connector section of a PC card connector according to another embodiment of the invention.
Figure 5:
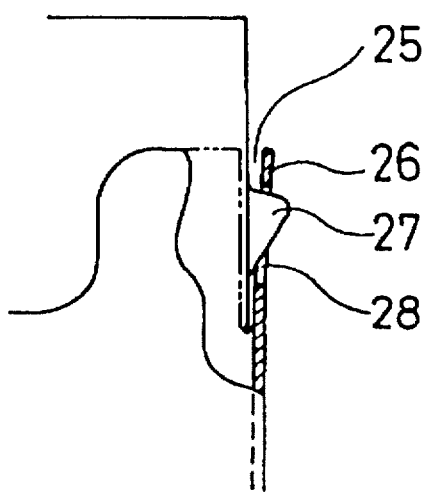
FIG. 5 is a plan view, partially cutaway, of a lock mechanism of the PC card connector of FIG. 3.

Alternatively, the cantilever spring may be separated from the ejector lever as shown in FIG. 3. A pair of spring cavities 21 and 22 are provided in the rear portions of the guide sections 3 and 4 to accommodate compression springs 23 and 24 having an end attached to the slider member 13. As shown in FIG. 5, a slit 25 extends forwardly from the rear end of the slider member 13 to provide a leaf spring 26. A triangular projection 27 provided on the guide section 3 has a steep rear slope and a gentle front slope. An engaging window 28 is provided in the leaf spring 26 for forming a lock mechanism. As shown in FIG. 3, the guide section 4 has a similar lock mechanism. Alternatively, the compression springs may be replaced by tension springs in a modified embodiment.

When a PC card is inserted into the connector to move the slider member 13 rearwardly, the compression springs 23 and 24 are compressed within the spring cavities 21 and 22. As shown in FIG. 5, the engaging windows 28 of the leaf springs 26 engage the triangular projections 27 of the guide sections 3 and 4 for making a lock, keeping the springs 23 and 24 compressed.

Figure 4:
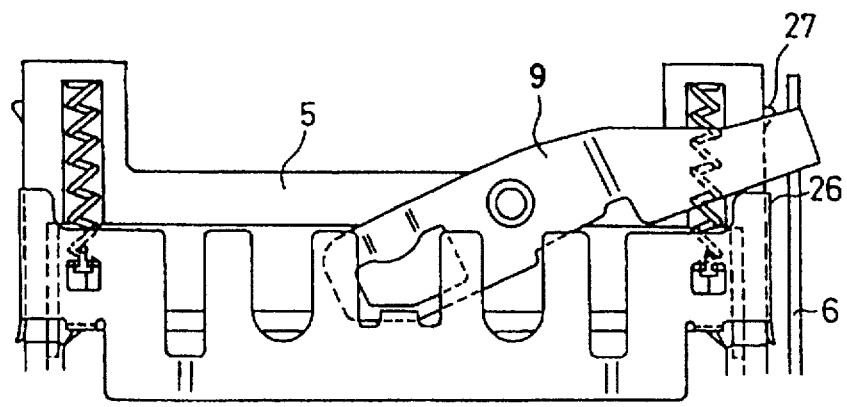
FIG. 4 is a plan view of the connection section of FIG. 3 wherein the PC card is released from the connection.

To remove the PC card, the ejector bar 6 is depressed as shown in FIG. 4. Consequently, the ejector lever 9 turns counterclockwise to push forwardly the PC card through the slider member 13 thereby releasing the PC card from the connection to the connector section 5. Until this point, the operation is the same as that of the embodiment in FIGS. 1 and 2. When the slider member 13 is moved forwardly by the ejector lever 9, the leaf springs 26 run over the triangular projections 27 for releasing the lock. Consequently, the PC card is pushed by the compression springs 23 through the slider member 13 for more forward movement, thereby facilitating removal of the PC card.

Alternatively, the lock mechanism in FIGS. 3–5 may be omitted by selecting the appropriate spring force. The above springs are provided only to push forwardly the PC card which is disconnected from the connection section so that the power of spring forces is small. On the other hand, the number of contact elements of the PC card is very large and so is the connection force between the PC card and the connector section. Consequently, if the spring forces are set below the connection force but sufficiently large to push out the released PC card, the lock mechanism may be omitted without having any adverse effects.

As has been described above, the spring forces are applied through the slider member to the PC card which is released from the connector section so that the PC card is not inclined against the guide sections but removed smoothly. In addition, the spring forces push out the PC card so much in the removal direction that it is very easy to remove the PC card.

What is claimed is:

1. A PC card electrical connector for receiving a PC card having a plurality of contact elements provided at a front end, comprising:

a housing having a pair of guide sections for guiding sides of said PC card into said housing and a connector section connected to rear portions of said guide sections and having a fulcrum projection;

a slider member provided on said connector section for sliding movement along said guide sections and having abutment portions for abutment against said front end of said PC card;

an ejector bar connected to said ejector lever and movable rearwardly when depressed; and said ejector lever having a first push portion provided near said fulcrum projection for pushing forwardly said slider member and a second push portion spaced from said fulcrum projection further than said first push portion for applying spring forces to said slider at least after said PC card is disconnected from said connector section by said first push portion said elector bar directly connected to said ejector lever at an end opposite to said first and second push portions with respect to said fulcrum so that when it is depressed with a force, it rotates said elector lever counterclockwise to elect said PC card with said pushing force.

2. A PC card electrical connector according to claim 1, wherein said second push portion is made in a form of cantilever beam spring extending from said ejector lever and flexes when said slider member moves forwardly and further moves said PC card with spring forces when said PC card is disconnected from said connector section.

3. A PC card electrical connector for connection with a PC card having a plurality of contact elements provided at a front end, comprising:

- a housing having a pair of guide sections for guiding sides of said PC card into said housing and a connector section connected to rear portions of said guide sections and having a fulcrum projection;
- a slider member provided on said connector section for sliding movement along said guide sections and having abutment portions for abutment against said front end of said PC card;
- an ejector lever rotatable about said fulcrum projection of said housing and having a push portion provided near said fulcrum projection;
- an ejector bar connected directly to said ejector lever at an end opposite to said push portion with respect to said fulcrum and movable rearwardly when depressed so that when it is depressed with a force, it rotates said elector lever counterclockwise to disconnect said PC card from said connector section;
- a spring provided between said slider member and said housing and elastically deformed as said slider member is moved rearwardly; and
- lock means for locking said spring in said elastically deformed state when said PC card is inserted into said housing and releasing said lock when said PC card is disconnected from said connector section so that said spring further pushes said disconnected PC card toward removal.

4. A PC card electrical connector for connection with a PC card having a plurality of contact elements provided at a front end, comprising:

- a housing having a pair of guide sections for guiding sides of said PC card into said housing and a connector section connected to rear portions of said guide sections and having a fulcrum projection;
- a slider member provided on said connector section for sliding movement along said guide sections and having abutment portions for abutment against said front end of said PC card;
- an ejector lever rotatable about said fulcrum projection of said housing and having a push portion provided near said fulcrum projection;
- an ejector bar connected directly to said ejector lever at an end opposite to said push portion with respect to said fulcrum and movable rearwardly when depressed so that when it is depressed with a pushing force, it rotates said elector lever counterclockwise to disconnect said PC card from said connector section; and
- a spring provided between said slider member and said housing and elastically deformed as said slider member is moved rearwardly by said PC card inserted and having a spring force smaller than a connection force between said PC card and said connector section so as to push said disconnected PC card toward further removal.

* * * * *